Nov. 22, 1955 I. R. BARR 2,724,624

HIGH IMPACT STRENGTH BEARING

Filed May 29, 1953

INVENTOR.
IRWIN R. BARR
BY Billy I. Corber

United States Patent Office 2,724,624

Patented Nov. 22, 1955

1

2,724,624

HIGH IMPACT STRENGTH BEARING

Irwin R. Barr, Kingsville, Md., assignor to Aircraft Armaments, Inc., Baltimore, Md., a corporation of Ohio Application May 29, 1953, Serial No. 358,455

11 Claims. (Cl. 308—200)

This invention relates in general to bearings and more particularly to a plastic bearing having a high impact strength. Primary load carrying balls and idler balls slightly smaller in diameter than the primary load carrying balls are alternately arranged in a chamber or raceway formed by grooves in a pair of bearing races. The primary load carrying balls transmit the normal steady load from one race to the other but when an impact load is applied, the primary load carrying balls deflect sufficiently to allow the idler balls to engage the raceway and assist in sustaining the load.

An object of this invention is to provide a plastic bearing construction wherein the rolling elements are carried in raceways so shaped as to allow controlled deflection of the rolling elements for distributing the bearing load and maintaining the bearing pressures below the critical value at which permanent deformation of the balls or races will occur.

Another object of this invention is to provide a low friction bearing having a high impact strength and which needs no lubrication.

Another object of this invention is to provide a bearing of non-magnetic and non-conducting material which will not oxidize or deteriorate in the presence of moisture and which is substantially unaffected in its operation by changes in climatic conditions.

Still another object of this invention is to provide a bearing which may be easily and economically manufactured.

Further and other objects will become apparent from a reading of the following detail description especially when considered in combination with the accompanying drawing wherein like numerals refer to like parts.

Figure 1:
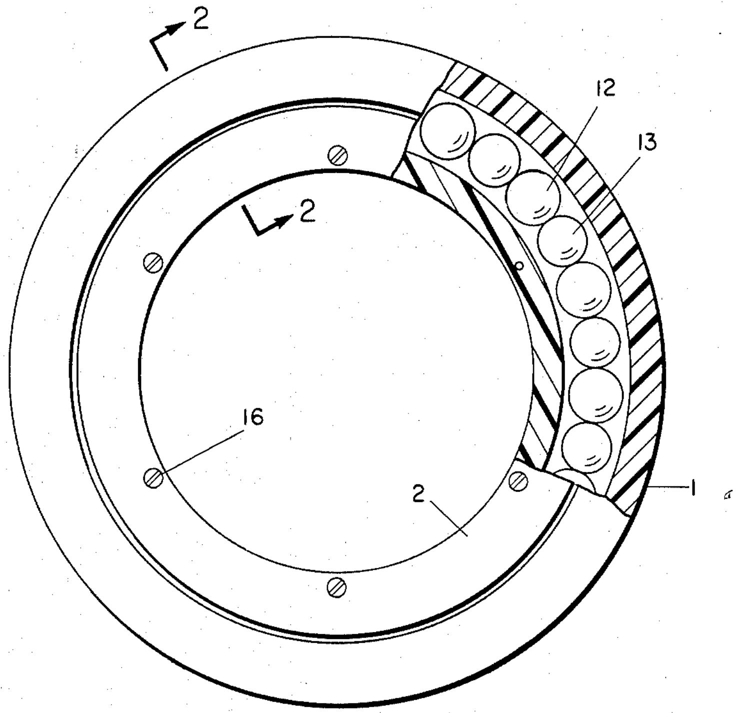
Figure 1 is a fragmentary view showing the bearing of this invention.
Figure 2:
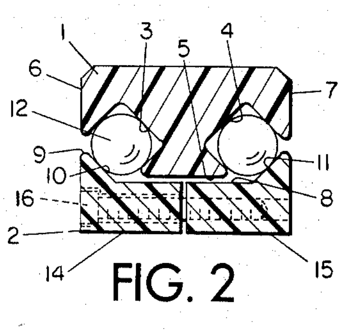
Figure 2 is a sectional view taken on line 2—2 of Figure 1.

The bearing shown in Figures 1 and 2 includes an outer race 1 and an inner race 2 concentrically arranged relative to the outer race. A pair of annular grooves 3 and 4 are formed in outer race 1 at the intersection of inner wall 5 with side walls 6 and 7. Grooves 3 and 4 are generally rectangular in cross-section, having substantially flat walls disposed at an angle of approximately 45 degrees relative to inner wall 5.

Inner race 2 is provided with an annular recess 8 in the outer wall 9 thereof forming a pair of generally flat bearing seating surfaces 10 and 11. Seating surfaces 10 and 11 are disposed at an angle of approximately 45 degrees relative to inner wall 5 of race 1 whereby to cooperate with the walls forming grooves 3 and 4 and provide a pair of annular chambers generally square in cross-section as shown in Figure 2.

A plurality of generally spherical primary load carrying balls 12 and a plurality of generally spherical idler balls 13 are alternately arranged within grooves 3 and 4 to completely fill the chambers. Both the primary load carrying and idler balls 12 and 13 are composed of synthetic thermosetting resins which are cured to produce the desired surface hardness. For best operation the surface hardness should be, according to test results, between 50 and 150 as measured on the "M" scale of a standard "Rockwell" hardness tester. To obtain a hardness of over 80 or 90, filler material may be used in the synthetic resins if necessary. The diameter of load carrying balls 12 is substantially equal to the smallest cross-sectional dimension of the chambers formed by the walls of grooves 3 and 4 and recess 8 so that each load carrying ball is substantially contiguous with all four of the chamber walls. Since the cross-sectional shape of the chamber is generally square and the balls carried therein are round, limited space is provided in the raceway allowing elastic deformation of the balls. The idler balls 13 are smaller in diameter than the primary load carrying balls by an amount such that when an impact load is applied to the bearing, causing the primary load carrying balls to deflect, the idler balls will engage the races and share the portion of the load which is in excess of the normal static bearing loading. This distributes the high loads and allows the bearing to absorb the energy without being damaged. Though the optimum size of the idler balls depends largely upon the resiliency of the load carrying balls and of the races, in general the diameter of the idler balls should be between 90 and 99% of the diameter of the load carrying balls.

2

Outer and inner races 1 and 2 are made from layers of cotton fabric or the like impregnated with synthetic thermosetting resin and cured to produce the desired hardness. For best results, the races should be less resilient than the balls and have a hardness greater than 100 as measured on the "M" scale of a standard "Rockwell" hardness tester. The fabric reinforces the synthetic resin, giving the races greater strength and toughness as compared with balls 12 and 13.

To allow quick assembly and dis-assembly of the bearing, inner race 2 is cut circumferentially, bisecting recess 8 and providing two separate annular ring members 14 and 15 adapted to be secured together as a unitary structure by a plurality of studs 16. With members 14 and 15 of inner race 2 secured together and concentrically arranged relative to outer race 1, balls 12 and 13 are confined within the chambers formed by annular grooves 3 and 4 to absorb the bearing loads applied between the inner and outer races.

Loads applied to the bearing in a radial direction are transmitted through the balls in both grooves 3 and 4 while thrust loads applied in an axial direction are applied to the balls in but one of the grooves.

The normal steady load on the bearing is sustained by primary load carrying balls 12, leaving idling balls 13 free to rotate between the primary load carrying balls for eliminating sliding friction in the bearing. Since the bearing is made primarily from synthetic resins and operates substantially with only rolling friction, there is no need for lubrication.

Impact loads applied to the bearing are transmitted through the balls as is the normal steady load. The resiliency of the balls however in cooperation with the generally rectangular cross-sectional shape of grooves 3 and 4 allow primary load carrying balls 12 to deflect sufficiently under the impact load to permit idling balls 13 to engage the inner and outer races and aid in absorbing the impact. Because the impact load is distributed through more balls and over a larger area, the localized pressures do not exceed the maximum. That is, the pressures in the bearing are held to a value which will not cause permanent deformation of the balls or races.

Figure 3:
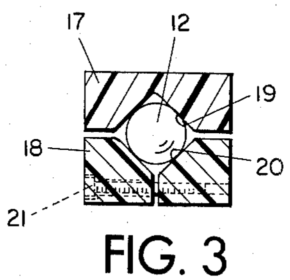
Figure 3 is a view showing a modified form of the bearing shown in Figures 1 and 2.

In Figure 3 a modified form of the bearing is shown wherein outer race 17 and inner race 18 are provided with annular V-shaped grooves 19 and 20 which cooperate to form a single bearing chamber generally square in cross-section. Inner race 18 is constructed in two parts which are secured together by studs 21 in the same manner as inner race 2 whereby the bearing may be easily assembled and dis-assembled. A plurality of primary load carrying balls 12 and a plurality of idling balls 13 are alternately arranged within the chamber formed by grooves 19 and 20 for transmitting bearing loads from one race to the other as previously described in connection with the bearing shown in Figure 2.

While the generally square cross-sectional shape of the chambers is considered important in obtaining the best results, it is believed obvious that the walls of the grooves may be curved in cross-section without losing the low-friction, high impact strength benefits of the invention so long as space is provided for the deflection of the balls. Any non-circular cross-sectional shape for the chambers will allow the balls to function in the described manner.

The fabric reinforced synthetic resin races have considerable toughness for good wearing qualities and for withstanding the forces applied thereto without failing. They also have a slight amount of resiliency, though less resiliency than the balls, so that the raceways will not be pitted or deformed due to the localized pressure applied by the balls.

Though the best results are obtained with synthetic resin impregnated fabric races, all plastic or all metal races may serve satisfactorily in applications where impact loads are not critical without departing from the teachings of this invention. Likewise, rollers may be substituted for balls as the rolling elements. It is to be understood that these and other alterations, modifications and substitutions may be made to the instant disclosure without departing from the spirit and scope of the invention as defined by the appended claims.

I claim:

1. A high impact strength bearing comprising, generally cylindrical resin impregnated fabric inner and outer bearing races, said outer race having an annular groove formed in the inner wall thereof adjacent said inner race, said inner race comprising a pair of mating ring members, means securing said ring members together as a unitary structure, said inner race having an annular recess in the outer wall thereof, said annular recess cooperating with said groove to form a chamber generally square in cross-section, a plurality of thermosetting resin primary load carrying balls carried within said chamber for rotation in response to relative movement between said races, the diameter of said primary load carrying balls being substantially equal to the cross-sectional width of said chamber, said races being less resilient than said primary load carrying balls whereby the latter are caused to deflect in response to a load applied to said bearing, a plurality of thermosetting resin idler balls carried within said chamber and alternately arranged relative to said primary load carrying balls for substantially eliminating sliding friction, said idler balls being more resilient than said races and smaller in diameter than said primary load carrying balls by an amount sufficient to effect engagement of said idler balls with said races for absorbing a portion of the bearing load only upon the application of an impact load exceeding the normal steady load applied to said bearing.

2. A high impact strength bearing comprising, a pair of bearing races, cooperating grooves in said races forming a chamber having walls generally flat in cross-section, a plurality of thermosetting resin load carrying rolling elements carried with said chamber for rotation in response to relative movement between said races, said load carrying rolling elements being more resilient than said races, a plurality of thermosetting resin idler rolling elements carried within said chamber and alternately arranged relative to said load carrying rolling elements for substantially eliminating sliding friction therebetween, said idler rolling elements being more resilient than said races, said idler rolling elements being smaller in diameter than said load carrying rolling elements by an amount sufficient to effect engagement of said idler rolling elements with said races for absorbing a portion of the bearing load only upon the application of an impact load exceeding the normal steady load applied to said bearing.

3. A high impact strength bearing comprising, a pair of bearing races, cooperating grooves in said races forming a chamber having walls generally flat in cross-section, a plurality of resilient primary load carrying rolling elements carried within said chamber for rotation in response to relative movement between said races, a plurality of resilient idler rolling elements carried within said chamber and alternately arranged relative to said primary load carrying rolling elements for substantially eliminating sliding friction therebetween, said idler rolling elements being smaller in diameter than said primary load carrying rolling elements by an amount sufficient to effect engagement of said idler rolling elements with said races for absorbing a portion of the bearing load only upon the application of an impact load exceeding the normal steady load applied to said bearing.

4. A high impact strength bearing comprising, a pair of bearing races, cooperating grooves in said races forming a chamber generally rectangular in cross-section, a plurality of resilient primary load carrying rolling elements carried within said chamber for rotation in response to relative movement between said races, a plurality of idler rolling elements carried within said chamber and alternately arranged relative to said primary load carrying rolling elements for substantially eliminating sliding friction between said load carrying rolling elements, said idler rolling elements being smaller in diameter than said primary load carrying rolling elements by an amount sufficient to effect engagement of said idler rolling elements with races for absorbing a portion of the bearing load only upon the application of an impact load exceeding the normal steady load applied to said bearing.

5. A high impact strength bearing comprising, a pair of bearing races, cooperating grooves in said races forming a chamber, a plurality of resilient primary load carrying rolling elements carried within said chamber for rotation in response to relative movement between said races, a plurality of idler rolling elements carried within said chamber and alternately arranged relative to said primary load carrying rolling elements for substantially eliminating sliding friction therebetween, said idler rolling elements being smaller in diameter than said primary load carrying rolling elements by an amount sufficient to effect engagement of said idler rolling elements with said races for absorbing a portion of the bearing load only upon the application of an impact load exceeding the normal steady load applied to said bearing.

6. A high impact strength bearing comprising, a pair of thermosetting resin impregnated fabric races, cooperating grooves in said races forming a chamber having the sides thereof generally flat in cross-section, a plurality of synthetic plastic load carrying rolling elements carried within said chamber for rotation in response to relative movement between said races, said load carrying rolling elements being more resilient than said races, a plurality of synthetic plastic idler rolling elements carried within said chamber and alternately arranged relative to said load carrying rolling elements for substantially eliminating sliding friction therebetween, said idler rolling elements being smaller in diameter than said load carrying rolling elements by an amount sufficient to effect engagement of said rolling elements with said races for absorbing a portion of the bearing load only upon the application of an impact load exceeding the normal steady load applied to said bearing.

7. A high impact strength bearing comprising, thermosetting resin impregnated fabric inner and outer races, said outer race having a groove formed in the inner wall thereof, said inner race comprising a pair of mating rings adapted to be joined together, said rings providing an annular recess in the outer wall thereof cooperating with said groove to provide an annular chamber generally rectangular in cross-section between said inner and outer races, the walls defining said chamber being disposed at a substantially 45 degree angle relative to the inner wall of said outer race, a plurality of generally spherical thermosetting resin balls being more resilient than said races and having a Rockwell "M" scale hardness of less than 150 contained within said annular chamber for rotation in response to relative movement between said inner and outer races, certain of said balls having a diameter substantially equal to the cross-sectional width of said chamber, and other of said balls being smaller in diameter and alternately arranged relatively to said certain balls whereby to eliminate friction within said bearing and to absorb a portion of the shock loads applied thereto.

8. A high impact strength bearing comprising, thermosetting resin impregnated fabric inner and outer races, said outer race having a pair of annular grooves formed in the inner wall thereof, said grooves having walls generally flat in cross-section, said inner race having an annular recess formed in the outer wall thereof cooperating with said grooves to provide a pair of spaced annular chambers generally rectangular in cross-section, a plurality of thermosetting resin load carrying rolling elements carried within said chambers for rotation in response to relative movement between said inner and outer races, said races being greater in hardness than said rolling elements whereby impact loads applied to said bearing are absorbed by the resiliency of said rolling elements, said load carrying rolling elements having a diameter nearly equal to the cross-sectional width of said chambers, said load carrying rolling elements in one of said chambers, absorbing thrust loads applied to said bearing in one direction, and said load carrying rolling elements in the other of said chambers absorbing thrust loads applied to said bearing in the opposite direction, and idler rolling elements carried within said chambers and alternately interposed between said load carrying rolling elements whereby to substantially eliminate sliding friction within said bearing, said idler rolling elements being smaller in diameter than said load carrying rolling elements and adapted to engage said races upon deflection of said load carrying rolling elements for absorbing a portion of the shock load applied to said bearing.

9. A high impact strength bearing comprising, a pair of resin impregnated fabric races, said races having grooves formed therein providing a chamber, said chamber having the walls thereof generally flat in cross-section, said races having a Rockwell "M" scale hardness of at least 100, a plurality of resilient thermosetting resin primary load carrying rolling elements carried within said chamber for rotation in response to relative movement between said races, the diameter of said primary load carrying rolling elements being nearly equal to the narrow cross-sectional dimension of said chamber, a plurality of thermosetting resin idler rolling elements carried within said chamber and alternately arranged relative to said primary load carrying rolling elements, said primary load carrying and idler rolling elements having a Rockwell "M" scale hardness no greater than 150, and said idler rolling elements being smaller in diameter than said primary load carrying rolling elements by an amount sufficient to effect engagement of said idler rolling elements with said races for absorbing a portion of the bearing load only upon the application of an impact load exceeding the normal steady load applied to said bearing.

10. A high impact strength bearing comprising, a pair of bearing races, cooperating grooves in said races forming a chamber, a plurality of primary load carrying rolling elements carried within said chamber for rotation in response to relative movement between said races, a plurality of idler rolling elements carried within said chamber and alternately arranged relative to said primary load carrying rolling elements for substantially eliminating sliding friction therebetween, said idler rolling elements being smaller in diameter than said primary load carrying rolling elements, said load carrying elements being sufficiently resilient to yield and allow said idler rolling elements to engage said races for absorbing a portion of the bearing load only upon the application of an impact load exceeding the normal steady load applied to said bearing.

11. A high impact strength bearing comprising, a pair of races, cooperating grooves in said races forming a chamber non-circular in cross-section, a plurality of resilient load carrying balls carried within said chamber for rotation in response to relative movement between said races, said load carrying balls having a diameter substantially equal to the narrow dimension of said chamber, a plurality of idler balls carried within said chamber and alternately arranged relative to said load carrying balls for substantially eliminating sliding friction therebetween, said idler balls being smaller in diameter than said resilient load carrying balls by an amount sufficient to effect engagement of said idler balls with said races for absorbing a portion of the bearing load only upon the application of an impact load exceeding the normal steady load applied to said bearing.

References Cited in the file of this patent

UNITED STATES PATENTS

| | | |
|---|---|---|
| 832,427 | Sisson | Oct. 2, 1906 |
| 1,907,905 | Van Hoorn et al. | May 9, 1933 |
| 1,927,466 | Menton | Sept. 19, 1933 |
| 2,400,374 | Selnes | May 14, 1946 |

FOREIGN PATENTS

| | | |
|---|---|---|
| 833,699 | France | Oct. 27, 1938 |
| 702,056 | Germany | Jan. 29, 1941 |